(12) United States Patent
Bryant

(10) Patent No.: US 7,758,747 B2
(45) Date of Patent: Jul. 20, 2010

(54) MODULAR FILTER SYSTEM FOR POLLUTION REMOVAL STRUCTURE

(76) Inventor: Graham Bryant, 129 Linden Ave., Westfield, NJ (US) 07090

( * ) Notice: Subject to any disclaimer, the term of this patent is extended or adjusted under 35 U.S.C. 154(b) by 9 days.

(21) Appl. No.: 12/006,297

(22) Filed: Jan. 2, 2008

(65) Prior Publication Data

US 2009/0166278 A1 Jul. 2, 2009

(51) Int. Cl.
*E03F 5/14* (2006.01)
(52) U.S. Cl. .............. 210/162; 210/163; 210/170.03; 210/232; 210/347; 210/434; 210/488
(58) Field of Classification Search ............. 210/162, 210/163, 164, 170.03, 323.2, 346, 347, 434, 210/457, 459, 488, 497.01, 232
See application file for complete search history.

(56) References Cited

U.S. PATENT DOCUMENTS

| | | | | |
|---|---|---|---|---|
| 272,881 A | * | 2/1883 | Houghton | 210/170.09 |
| 657,102 A | * | 9/1900 | Guy | 210/488 |
| 770,019 A | * | 9/1904 | Neireiter | 210/163 |
| 1,457,637 A | * | 6/1923 | Sievers | 210/163 |
| 1,793,599 A | * | 2/1931 | Egan | 210/170.03 |
| 5,707,527 A | * | 1/1998 | Knutson et al. | 210/170.03 |
| 5,725,760 A | * | 3/1998 | Monteith | 210/170.03 |
| 5,980,740 A | * | 11/1999 | Harms et al. | 210/162 |
| 6,533,941 B2 | * | 3/2003 | Butler | 210/170.03 |
| 6,793,811 B1 | * | 9/2004 | Fleischmann | 210/163 |
| 2008/0047886 A1 | * | 2/2008 | Lambert et al. | 210/163 |

\* cited by examiner

*Primary Examiner*—Christopher Upton

(57) ABSTRACT

A modular filter system for use within a pollution removal structure. The system includes a plurality of modular filters that can be nested together forming a common passageway that passes through all of the nested filters. With normal runoff, the water passes laterally through the filters and enters the common passageway to exit the structure. In the event of a high flow of runoff, an overflow pipe conveys water directly to a downstream storm drain by-passing the filter system. The overflow is created by either: a) allowing the water to rise above the upper surface of the upper modular filter and directly into the common passageway or b) by overflow pipes which connect to a downstream pollution removal structure; or a combination of paths a) and b). By using nested filters, the number of filters nested together can be customized in accordance with the depth of the particular storm drain.

14 Claims, 4 Drawing Sheets

MODULAR FILTER SYSTEM FOR POLLUTION REMOVAL STRUCTURE

TECHNICAL FIELD

The present invention relates generally to a system for trapping pollution in a structure, and, more particularly, to a system having modular filters that interfit with each other to filter the water passing therethrough.

BACKGROUND OF THE INVENTION

In a pollution removal structure, there can be a filter that serves to remove pollution from the water as it passes through the storm drain. The filter thereby prevents particulate material and dissolved matter from passing further along the flow of water. At the present, there is normally a single filter that filters the water such that the water enters into and though the sides of the filter and thereafter flows by gravity downwardly through a central passageway to a discharge pipe that directs the water away from the storm drain.

One of the difficulties, therefore, in the construction of a pollution removal structure is that the depth of the structure may vary such that the height of the filter that is located in that structure can be uncertain and often the filter is not the proper height for the particular structure.

Accordingly, it would be advantageous to have a filter that could be varied in overall height to be adaptable to the depth of a particular pollution removal structure.

In addition, filters are typically added horizontally in a large horizontal structure making removal and replacement difficult. A vertically oriented filter would be advantageous for the removal and replacement of filter cartridges on a regular basis.

SUMMARY OF THE INVENTION

The present invention thus is a filter system that can be used in a pollution removal structure wherein a plurality of modular filters are used that can be nested together to form the overall filter for that structure.

Each modular filter has an upper inlet and an outlet with a passageway therebetween, with the upper inlet facing upwardly when the filter is in its as used orientation. The inlets and outlets are located such that they align when one filter is located atop of another filter, that is, the outlet of the upper filter will be automatically aligned with the inlet of the lower filter such that the individual passageways combine to form a common central passageway where water can pass through all of the filters that are stacked together to exit the structure via the discharge pipe.

As such, the number of modular filters can be determined and installed according to the depth of the structure so that the height of the overall nested filters will be appropriate to that particular structure. Under the normal flow of runoff water, the water will collect in the structure and pass inwardly through a lateral inlet of the filters to pass through the filter media toward the center of the filters and thereafter be drained into the common central passageway formed in the nested filters. In such manner, the undesirable materials are filtered out. In the event of a large or high flow runoff entering the structure, the water may rise to a predetermined height whereupon the water may directly enter the common central passageway and proceed to be drained through the discharge pipe without being filtered. In a variation of the design, separate overflow pipes could be added to convey the high flows.

Accordingly, the present filtering system can operate in its normal filtering mode to remove particulate matter from the runoff water when a normal or low flow of water is passing through the structure whereas if a large or high flow runoff is experienced, the high flow of water will bypass the filtering function and either pass directly through the common central passageway formed by the plurality of nested, modular filter, be conveyed by a separate overflow pipe, or some combination thereof.

These and other features of the present invention will become apparent upon review of the following detailed description of the present embodiments of the separation tank, when taken in conjunction with the drawings and the appended claims.

DETAILED DESCRIPTION OF THE INVENTION

Figure 1:
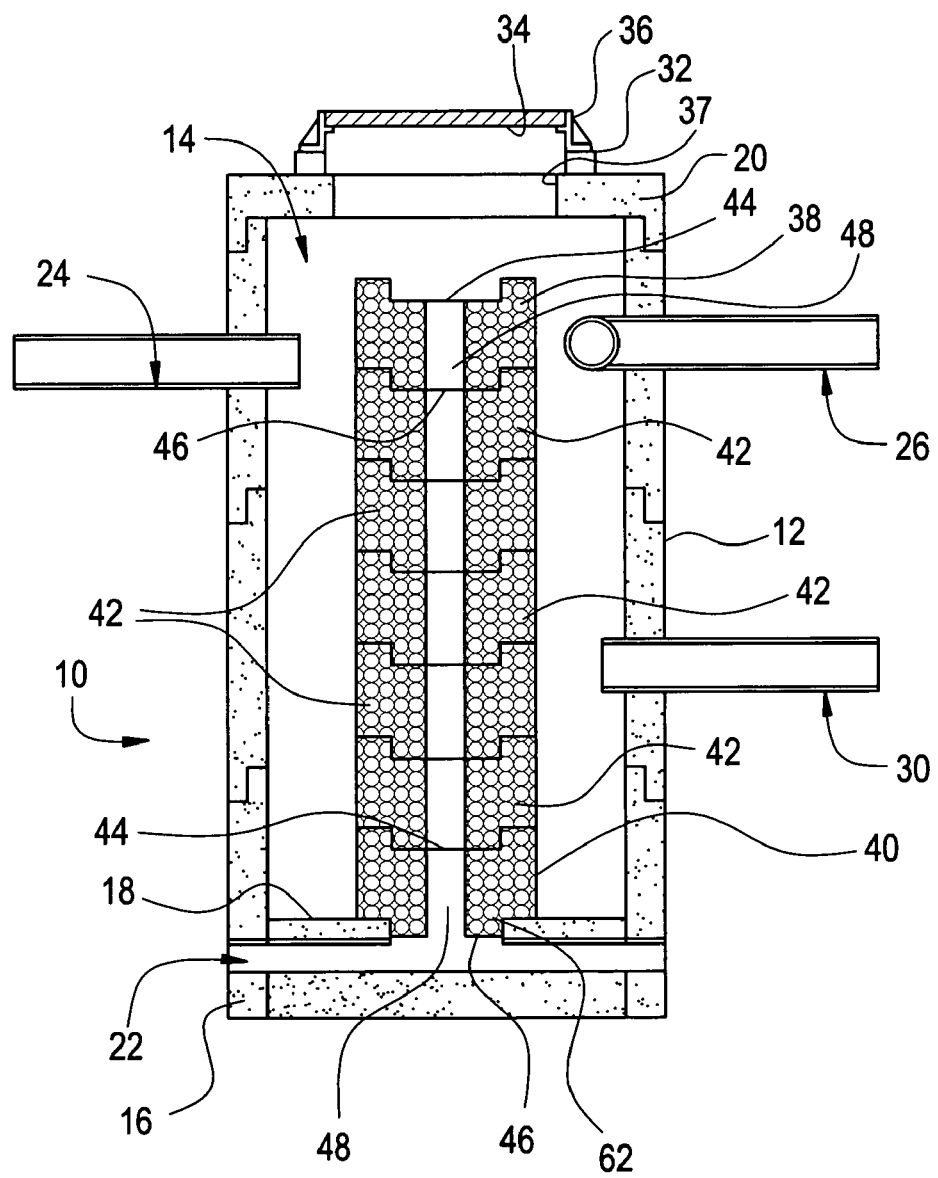
FIG. 1 is a side cross-sectional view of a storm drain having a filter system of the present invention.
Figure 2:
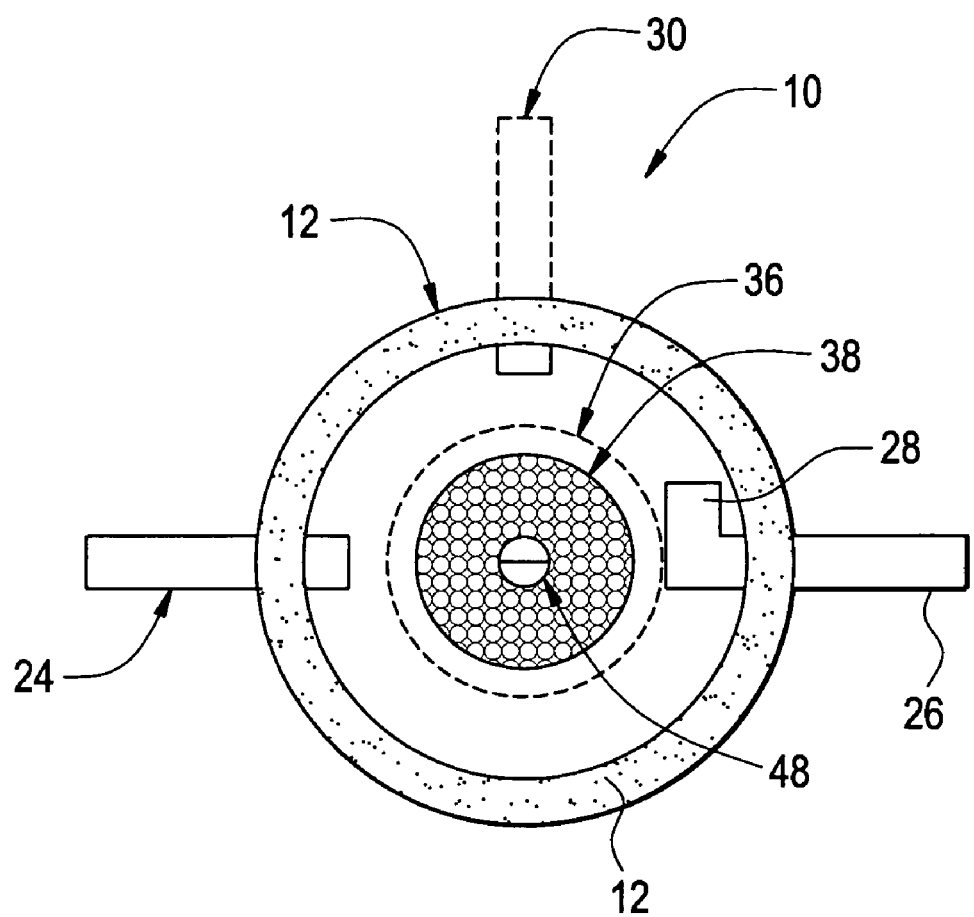
FIG. 2 is a top view of the storm drain of FIG. 1 with a filter system of the present invention.

Referring now to FIGS. 1 and 2, there is shown a side cross-sectional view and a top view respectively, of a pollution removal structure 10 for use with the present invention. As can be seen, the structure 10 is comprised of a circular concrete wall 12 that may be constructed in vertical sections and which receives the storm run-off water. While illustrated as circular, the structure 10 may be of other configurations, including rectangular, oval etc. and can be constructed of other materials such as concrete block, steel or the like.

The wall 12 basically encloses and creates a chamber 14 for the run-off water where that water may accumulate over time and be filtered prior to being discharged to a groundwater conveyance system or downstream storm drain. Thus as can be seen, the structure 10 includes a base 16, which can also be a concrete material and which has an upper surface 18 and a cover 20 that seals the upper opening or upper inlet of the chamber 14. A discharge pipe 22 passes through the base 16 and carries water from the structure 10 to be discharged into the surrounding ground, leaching field, or downstream storm drain. Although discharge pipe 22 is shown within the base 16, it is obvious that the filter system can be raised such that discharge pipe 22 sits on the base 16 of the structure 10.

There is also an outlet pipe 24 that communicates with the chamber 14 and which can be used to carry overflow water from chamber 14 to another storm drain. The outlet pipe 24 is preferable located in the vertically upper area of the structure 10. Additionally, there can be an inlet pipe 26 that can be used to receive water from a storm drain or separator such that the filter can be used either as an inlet to the structure or online anywhere within the storm drain system. The inlet pipe 26 is preferably located in the vertically upper area of the storm drain 10. An upstream sedimentation system that can be used to feed water to the inlet pipe 26 can be that shown and described in my U.S. Pat. No. 6,951,619, issued Oct. 4, 2005 and the disclosure of that patent is hereby incorporated herein in its entirety. As can be seen in FIG. 2, the inlet pipe 26 preferably has a ninety degree bend 28 so that the water entering the chamber 14 will tend to swirl around within that chamber 14.

Another outlet pipe 30 can be provided in communication with the chamber 14 and which is used to divert water from the chamber 14 to another filter system constructed in accordance with the present invention to obtain more recharge volume. As can be seen, the outlet pipe 30 is located intermediate the base 16 and the cover 20 and is preferably in the lower half of the structure 10 but above the base 18 of the structure 10 such that the pipe 30 does not become clogged with sediment.

The cover 20 can comprise a frame 36 having a removable grate 34 aligned over the opening 37 in the raised cover 20 if the structure 10 is used as an inlet. If the structure 10 is to be used online with an inlet pipe 26, the cover 20 can comprise a frame 36 having a removable solid cover 34 aligned over the opening 37 in the cover 20. The frame and cover/grate can be vertically adjusted using bricks or concrete rings 32 as required to meet the ground surface.

Within the interior of chamber, there is a plurality of modular filters including an upper modular filter 38, a lower modular filter 40 and intermediate modular filters 42. Each of the modular filters has an upper inlet 44 and an outlet 46 and a passageway 48 extending between the upper inlet 44 and the outlet 46, (for convenience in FIG. 1 only the upper inlet 44 of the upper modular filter 38 and the outlet 46 of the lower modular filter 40 and the passageways 48 of those modular filters is identified), it being understood that each of the modular filters 38, 40, 42 are similarly shaped and the upper inlet and outlet of each is located in a predetermined position such that, when the modular filters 38, 40 and 42 are stacked together as shown in FIG. 1, the outlet of one modular filter interfits with the upper inlet of the modular filter next below so as to form a common passageway made up of the aggregate of all of the individual passageways 48 of the modular filters 38, 40 and 42.

Figure 3:
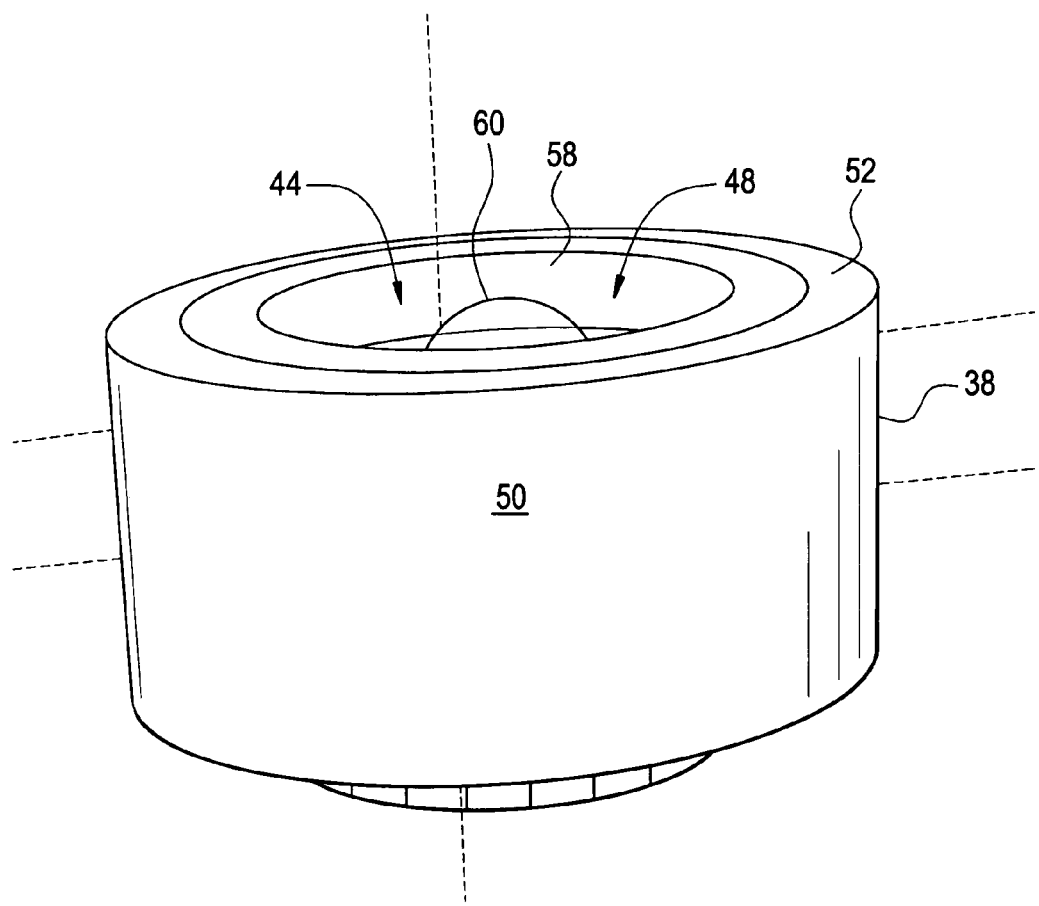
FIG. 3 is a top perspective view of a modular filter of the present invention.
Figure 4:
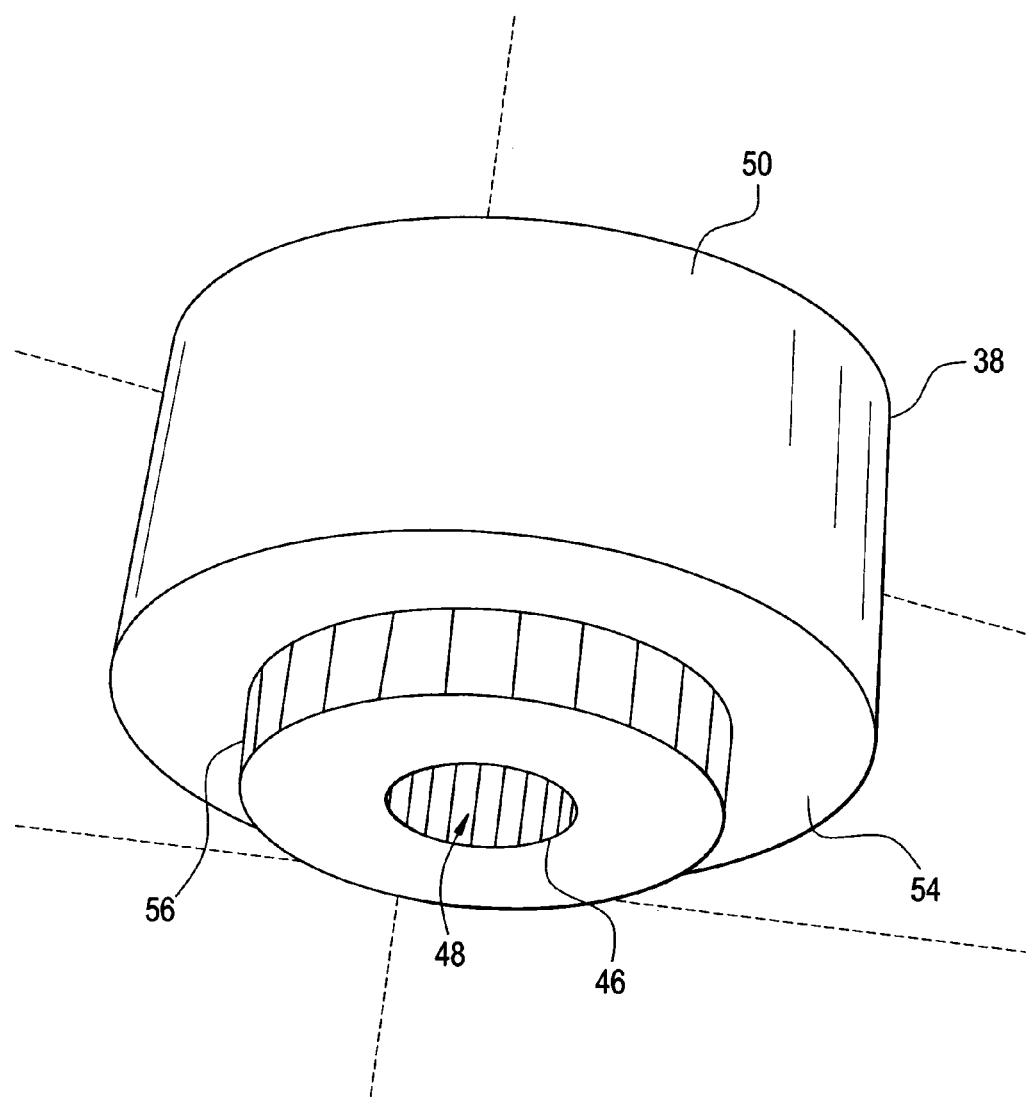
FIG. 4 is a bottom perspective view of a modular filter of the present invention.

Turning now to FIGS. 3 and 4, there is shown top and bottom perspective views of a typical modular filter, such as, for example, the upper modular filter 38. As can be seen in the exemplary embodiment, the upper modular filter 38 is comprised of a cylindrical body 50 and has an upper surface 52 and a lower surface 54 with the passageway 48 extending between and communicating with the centrally located inlet 44 and outlet 46. The outlet 46 itself is formed as a cylindrical projection 56 extending outwardly from the cylindrical body 50 and has a reduced diameter with respect to the outer diameter of the cylindrical body 50.

In a similar manner, the inlet 44 is a cylindrical indentation 58 having a diameter that is about the same as the diameter of the outlet 46, with the outlet 46 being just slightly smaller in order to provide a generally watertight fit when the outlet 46 of one modular filter in interfitted into the inlet 44 of another modular filter. In the embodiment where the modular filters are cylindrical, the inlet and outlet are both preferably formed along the longitudinal axis of the modular filter.

As can be seen, while the exemplary embodiment illustrates an embodiment where the inlet has a cylindrical indentation and the outlet has a cylindrical projection, the projection and indentation may be reversed or other configuration of inlets and outlets can be employed, it only being of significance that the outlet of a modular filter that is vertically orientated above another modular filter be in alignment with the inlet of the lower oriented modular filter.

The modular filters are constructed of a material that filters the water that can pass laterally inwardly via a lateral inlet through the filter media of the cylindrical body 50 to reach the passageway 48 and that material may be plastic, or other comparable material. As a convenience, there may also be a handle 60 provided at the top of the modular filters to facilitate the handling and installation of the modular filters. Gaskets may be employed on either or both of the surfaces 52 or 54 to further ensure water tightness where the modular filters, connect.

Accordingly, the operation of the overall water filter system can now be described. The runoff water from a storm enters structure 10, grate 34 and opening 37, and or inlet pipe 26, to enter the chamber 14. Under normal runoff, the water will accumulate to some level within the chamber 14 depending upon the flow of the runoff water and that water will proceed laterally inwardly through a lateral inlet in one or more of the modular filters beginning at the lower modular filter 40 and working upwardly to the intermediate modular filters 42, again, depending upon the level of that water in chamber 14. The water is thus filtered by the modular filters and passes into the passageway 48 where it proceeds downwardly by gravity to be discharged through the discharge pipe 22.

As can be seen, since all of the passageways 48 of the individual modular filters are aligned to form a common central passageway, the water will proceed to the discharge pipe along the same passageway no matter how many modular filters it passes through.

In the event of a large flow runoff, the water can rise to a level such that the water can pass into the inlet 44 of the upper modular filter 38 and that excess water then passes directly through the common central passageway to the discharge pipe 22 thereby bypassing the filtering function. If the passageway 48 is not large enough to convey the required peak flows, an additional standpipe(s) located in chamber 14 can be connected directly to pipe 22 to convey flows to the downstream storm drain system. The height of the vertical standpipe(s) would be below the top filter module 38. If pipe 22 is connected to a groundwater discharge system, the overflow can be conveyed by pipe 24 to the downstream storm drain system to prevent the discharge of untreated water to groundwater through passageway 48.

By the use of the individual modular filters, the number of filters can vary from storm drain to storm drain, that is, the desired number of modular filters can be installed in the storm drain depending upon the particular depth D of a storm drain. Thus, there may be 2, 3, 4, 5 or a greater number of modular filters that can be stacked together as is appropriate to the depth of the storm drain so that a custom made filter is not needed for each different depth of storm drain. In each instance, no matter how many modular filters are used, they all stack and interfit together such that the outlet of a modular filter communicates directly with the inlet of the next lower modular filter to create a common central passageway to carry the water as described.

As such the installation of a water filter system in a storm drain can be readily accomplished by positioning the lower modular filter 40 against the bottom 16 of the structure 10. As shown in FIG. 1, that installation can be accomplished by interfitting the outlet 46 of the lower modular filter 40 into an opening 62 in the bottom 16. Thereafter, the intermediate modular filters 42 can be nested to the next lower modular filter to build up the filter system to locate the upper modular filter 38 at the desired elevation for the particular storm drain.

Those skilled in the art will readily recognize numerous adaptations and modifications which can be made to the water separation tank of the present invention which will result in an improved storm drain filter system, yet all of which will fall within the scope and spirit of the present invention as defined in the following claims. Accordingly, the invention is to be limited only by the following claims and their equivalents.

What is claimed is:

1. A system for removing pollution material such as particulate material and/or dissolved matter from water, the system comprising a pollution removal structure forming an underground chamber having an upper access opening for installation, inspection and maintenance having a openable cover wherein water entering the underground chamber is conveyed through a filter system and the filtered water is discharged through a discharge pipe into the surrounding ground, said system further comprising:

a plurality of vertically oriented modular filters having a filter media located within the chamber to filter out particulate material and/or dissolved matter from water passing therethrough, each of said modular filters having an upper inlet and a outlet formed in the modular filters with a passageway therebetween, wherein water can enter each filter laterally through a lateral inlet to pass through the filter media to reach the passageway, the outlet of a filter adapted to interfit into the upper inlet of the next lower filter wherein the outlet of one filter aligns with the upper inlet of another filter to form a common central passageway for water to pass serially though the plurality of filters to the discharge pipe to the surrounding ground, said plurality of vertically oriented modular filters being accessible through the upper access opening so as to be serially, vertically stacked or removed individually through the upper access opening.

2. The system of claim 1 wherein the upper inlets and outlets of the modular filters are centrally located in the modular filters.

3. The system of claim 2 wherein the upper inlets and outlets of the modular filters are circular in configuration.

4. The system of claim 3 wherein the modular filters have a cylindrical body and wherein the outlets are cylindrical projections extending outwardly from the body and having a reduced diameter than the cylindrical body.

5. The system of claim 4 wherein the inlets are cylindrical indentations and wherein the cylindrical projections fit into the cylindrical indentations.

6. The system of claim 3 wherein the modular filters have a cylindrical body and wherein the inlets are cylindrical projections extending outwardly from the body and having a reduced diameter than the cylindrical body.

7. The system of claim 6 wherein the outlets are cylindrical indentations and wherein the cylindrical projections fit into the cylindrical indentations.

8. The system of claim 1 wherein the system further includes an inlet pipe located laterally in the vertically upper area of the chamber to allow water to enter into the chamber.

9. The system of claim 1 wherein the system further includes an outlet pipe located in the vertically upper area of the chamber to allow water to pass outwardly from the chamber.

10. The system of claim 1 wherein the openable cover comprises a grate that allows water to enter vertically into the underground chamber.

11. A method of installing a modular water filter system for removing particulate material and/or dissolved matter, the modular water filter system being installed in an underground chamber having an upper access opening for installation, inspection and maintenance with a openable cover, the method comprising the steps of:

passing a first modular filter capable of filtering particulate material and/or dissolved matter downwardly through the upper access opening and into the underground chamber, said first modular filter having a filter media having an upper inlet and an outlet, the first modular filter being oriented with the upper inlet facing upwardly and the outlet facing downwardly and in communication with a chamber discharge pipe, passing a second modular filter capable of filtering particulate material and/or dissolved matter downwardly through the upper access opening and into the underground chamber, the second modular filter interfitting with the first modular filter and having a filter media in a position vertically atop of the first modular filter, the second modular filter having an upper inlet and an outlet, wherein the upper inlet of a first modular filter communicates with the outlet of the second modular filter so as to create a central common passageway for the flow of water through both the first and second modular filters.

12. The method of claim 11 wherein the step of placing a first modular filter within a structure comprises placing a first modular filter having a centrally located upper inlet and a centrally located outlet.

13. The method of claim 12 wherein the step of placing a first and second modular filter within a structure comprises placing cylindrical first and second modular filters, each having a circular upper inlet and a circular outlet aligned along the longitudinal axis of the modular filters.

14. The method of claim 11 wherein the step of placing a first and second modular filters within a structure comprises interfitting a cylindrical projection outlet of one modular filter into a cylindrical indentation upper inlet formed in the other modular filter.

* * * * *